(12) United States Patent
Wu et al.

(10) Patent No.: US 10,311,160 B2
(45) Date of Patent: *Jun. 4, 2019

(54) CLOUD SEARCH ANALYTICS

(71) Applicant: A9.com, Inc., Palo Alto, CA (US)

(72) Inventors: Nanheng Wu, Pittsburgh, PA (US); Anoop Kochummen Johnson, Santa Clara, CA (US); David Robert Lewis, Palo Alto, CA (US)

(73) Assignee: A9.COM, INC., Palo Alto, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 14/857,692

(22) Filed: Sep. 17, 2015

(65) Prior Publication Data

US 2016/0004776 A1 Jan. 7, 2016

Related U.S. Application Data

(63) Continuation of application No. 13/842,610, filed on Mar. 15, 2013, now Pat. No. 9,152,667.

(51) Int. Cl.
*G06F 17/30* (2006.01)
(52) U.S. Cl.
CPC .. *G06F 17/30864* (2013.01); *G06F 17/30424* (2013.01); *G06F 17/30657* (2013.01)
(58) Field of Classification Search
CPC ................................................ G06F 17/30864
USPC ........................................................ 707/769
See application file for complete search history.

(56) References Cited

U.S. PATENT DOCUMENTS

| 7,543,005 | B1 * | 6/2009 | Edelman | ............. G06F 17/3089 |
| 7,774,335 | B1 * | 8/2010 | Scofield | ............ G06F 17/30864 707/709 |
| 8,090,724 | B1 * | 1/2012 | Welch | ............... G06F 17/30616 707/750 |

(Continued)

FOREIGN PATENT DOCUMENTS

| CN | 103544301 | | 1/2014 |
| CN | 103544301 A | * | 1/2014 |

(Continued)

OTHER PUBLICATIONS

Amazon CloudSearch Developer Guide, API Version Feb. 1, 2011, 225 pages.

(Continued)

*Primary Examiner* — Kimberly L Wilson
(74) *Attorney, Agent, or Firm* — Hogan Lovells US, LLP

(57) ABSTRACT

Systems and methods of analyzing search metrics are disclosed. System users are provided with insight into the query or search activity in their system domains. Disclosed systems can enable continuous monitoring of search engine logs for search events (i.e., searches performed by applications using the search engine. Collected data regarding search events is used to derive various metrics such as the total number of queries performed in a relevant period, the total number of queries without results; the top N queries with counts; the top N queries which produced no results, with counts; and the top N documents in results, with counts. In at least one embodiment of the disclosure all such metrics are computed for a last full hour period and all metrics, except in some cases a top-N report, are available for user viewing on an hourly basis.

18 Claims, 11 Drawing Sheets

(56) References Cited

U.S. PATENT DOCUMENTS

| | | | | |
|---|---|---|---|---|
| 8,135,580 B1* | 3/2012 | Jin | G06F 17/275 | |
| | | | 704/7 | |
| 8,280,783 B1* | 10/2012 | Brownell | G06Q 30/00 | |
| | | | 705/26.1 | |
| 8,290,818 B1* | 10/2012 | Levitan | G06Q 30/0631 | |
| | | | 705/26.7 | |
| 8,311,900 B1* | 11/2012 | Bates | G06Q 30/0601 | |
| | | | 705/27.1 | |
| 8,396,750 B1* | 3/2013 | Hariharan | G06Q 30/00 | |
| | | | 705/26.1 | |
| 8,438,149 B1* | 5/2013 | Dicker | G06F 17/30864 | |
| | | | 707/706 | |
| 8,463,769 B1* | 6/2013 | Enderton | G06F 17/30864 | |
| | | | 707/713 | |
| 8,533,054 B1* | 9/2013 | Haney | G06Q 30/06 | |
| | | | 705/26.1 | |
| 2008/0071929 A1* | 3/2008 | Motte | G06F 17/3089 | |
| | | | 709/246 | |
| 2009/0089372 A1* | 4/2009 | Sacco | G06F 17/3089 | |
| | | | 709/204 | |
| 2009/0222551 A1* | 9/2009 | Neely | G06Q 30/02 | |
| | | | 709/224 | |
| 2010/0228693 A1* | 9/2010 | Dawson | G06F 17/2705 | |
| | | | 706/12 | |
| 2011/0208710 A1* | 8/2011 | Lesavich | G06F 17/30864 | |
| | | | 707/706 | |
| 2013/0073388 A1* | 3/2013 | Heath | G06Q 50/01 | |
| | | | 705/14.53 | |
| 2013/0212129 A1* | 8/2013 | Lawson | G05B 19/4185 | |
| | | | 707/779 | |
| 2014/0089082 A1* | 3/2014 | Lee | G06Q 30/0275 | |
| | | | 705/14.45 | |
| 2014/0297658 A1* | 10/2014 | Kanigsberg | G06F 17/30867 | |
| | | | 707/750 | |
| 2015/0066892 A1* | 3/2015 | Astore | G06F 17/30864 | |
| | | | 707/707 | |

FOREIGN PATENT DOCUMENTS

| | | | | |
|---|---|---|---|---|
| WO | WO 2006125922 A2 * | 11/2006 | | G09B 5/14 |
| WO | WO 2006125922 A8 * | 2/2007 | | G09B 5/14 |

OTHER PUBLICATIONS

Non Final Office Action dated Jan. 30, 2015 in U.S. Appl. No. 13/842,610.

Notice of Allowance dated Jun. 16, 2015 in U.S. Appl. No. 13/842,610.

* cited by examiner

CLOUD SEARCH ANALYTICS

CROSS-REFERENCE TO RELATED APPLICATIONS

This application is a continuation of U.S. patent application Ser. No. 13/842,610, filed Mar. 15, 2013 entitled "CLOUD SEARCH ANALYTICS" which is hereby incorporated herein by reference.

BACKGROUND

Computing devices are often used to communicate over a network such as the Internet. Computing resources (hardware and software) that are delivered as a service over a network (typically the Internet) are becoming increasingly utilized. Computing devices are frequently used to connect to network based services which can provide services such as storing searchable data to be used/retrieved by the computing devices or providing additional processing power to the computing devices. Searching tools such as search engines are sometimes used to search data and information in networks and network resources. The effectiveness of search tools can, however, be difficult to measure and analysis of search tools such as search engines can be cumbersome and time intensive.

BRIEF DESCRIPTION OF THE DRAWINGS

Various embodiments in accordance with the present disclosure will be described with reference to the drawings, in which.

DETAILED DESCRIPTION

Figure 1:
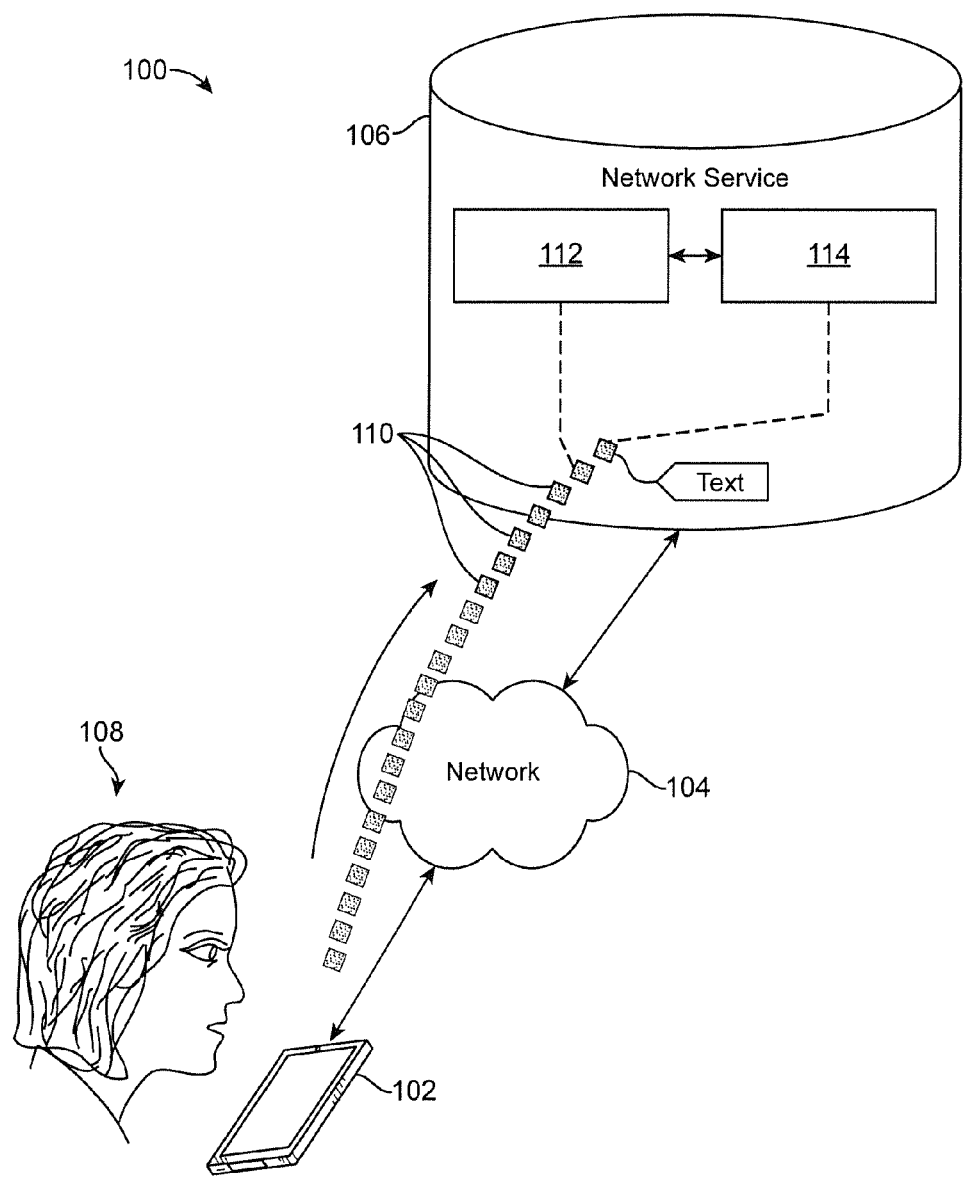
FIG. 1 illustrates an example environment 100 in which aspects of the various embodiments can be utilized.

Systems and methods in accordance with various embodiments of the present disclosure overcome one or more of the above-referenced and other deficiencies in conventional approaches to collecting and analyzing electronic search tools. In particular, various embodiments of the disclosure quickly and efficiently determine the most commonly used search keywords across a multitude of network resources. Various embodiments of the disclosure track search keywords (or "search terms") which produce no search results across a multitude of network resources. Some embodiments of the disclosure track the number of times particular search results, such as particular documents, for example, are produced by searches occurring in a relevant period.

At least some embodiments of the disclosure enable a computing device to upload data over a network (e.g., the Internet) onto a storage allocation provided by a network service (i.e., network service provider, network based service, etc.) and to search for the uploaded data over the network via the network service.

Several definitions that apply throughout this document will now be presented. The phrase "coupled" is defined as connected, whether directly or indirectly through intervening components and is not necessarily limited to physical connections. Coupled devices are devices which are in signal communication with one another.

The term "computing device" is defined as any device that is capable of at least accepting data, transmitting data, and executing commands. For example, computing devices can include, but are not limited to, portable communication devices, mobile communication devices, mobile computers, smart phones, computing pads, tablet computers, personal computers, desktop computers, laptop computers, netbooks, servers, routers, set-top phones, or other computing device capable of at least accepting data, transmitting data, and executing commands. A computing device can serve as a network resource, as will be explained below.

A "network" is a collection of computers and other hardware interconnected by communication channels that allow sharing of resources and information. Where at least one process in one device is able to send/receive data to/from at least one process residing in a remote device, then the two devices are said to be in a network. A network is a group of devices connected to each other. Networks may be classified by a wide variety of characteristics such as for example the medium used to transport the data, communications protocol used, scale, topology, benefit, and organizational scope. A "network resource" can be one or more devices within a network or a collection of one or more such networks.

Examples of network resources include, but are not limited to, personal computers, servers and the like. Any device networked with any other device can be considered a network resource. The term "fleet resource" refers to any lower level network resource which can run one or more search engines. (See next paragraph). A personal computer is an example of a fleet resource. The term "storage resource" means any device that is capable of storing large amounts of data, primarily—though not necessarily exclusively—for retrieval by other network resources. A remote server is an example of a storage resource. In at least embodiment of this disclosure, search data compiled by large numbers of fleet resources can be stored on one or more storage resources for subsequent retrieval and/or analysis by one or more reporting layer resources. The term "reporting layer resource" includes any higher level network resource such as a database service, for example. A reporting layer resource will often have more computational power than a storage resource. Within at least one embodiment of this disclosure, reporting layer resources can retrieve information from large numbers of other network resources such as storage resources, for analysis and reporting to customers.

A "search engine" is software code that is designed to search for information on the World Wide Web. Search results can be presented in a line of results often referred to as search engine results pages. Some search engines also mine data available in databases or open directories. Search engines can maintain real-time information by running an algorithm on a web crawler. Examples of search engines include, but are not limited to, such search engines as provided by Amazon.com, Bing, Ask-Jeeves, Google and Amazon Cloud Search as described in the "Amazon Cloud-Search Developer Guide API Version 2011-02-01," which is fully incorporated by reference herein.

A "keyword" or "search term" is a symbol or group of symbols which are entered into a search engine for searching. A keyword or search term can be a series of letters and/or characters not separated by a space and entered into a search. Thus, "knife" is an example of a keyword. A keyword or search term can also be a series of letters and/or characters separated by a space and entered into a search. Thus, "knife blade" is also an example of a keyword. If "knife blade" were searched, a single counter corresponding to "knife blade" would be incremented. In some embodiments of this disclosure, keywords can be parsed into separate keywords. So for the keyword "knife blade" could be considered two keywords, such that if "knife blade" were searched, a counter for "knife" would be incremented, and a counter for "blade" would be implemented. A person of skill in the art will understand that these examples are illustrative, non-limiting examples. If a search by a search engine or search tool locates a document, product or other type of corresponding information, the search can be said to return a result. If a search does not locate such a document, product or other type of relevant information, the search can be said to have returned no result. In at least one embodiment of this disclosure, data relating to the number of times a document, product or other type of information is produced by searches in one or more relevant periods, can be tracked, stored, collated and reported.

A "data file" or simply "file" is a computer file which stores data to use by a computer application or system. "File" can include data files that contain instructions or code to be executed, or to files which define the operation or structure of an application or system (which include configuration files, directory files, etc.). Files can be used to store information used as input, or written as output by some other software program.

A "counter" is a device which stores (and sometimes displays) the number of times a particular event or process has occurred, such as for example, how many times a particular keyword has been used, or how many times a particular keyword or group of keywords were used in search engine searches which yielded or produced no results.

A "timer" is a counter that either increments or decrements at a fixed frequency. A timer may have comparison logic to compare the timer value against a specific value, set by software, which triggers some action when the timer value matches a preset value (time T). A timer can be used, for example, to cause certain computer functions to be performed once every cycle having a length, period, time or time-period of T. For example, if T is set to 60 minutes, an analysis of search data could be tabulated once every 60 minutes. A timer can be set to run in conjunction with a clock cycle of a computer processor (or simply "processor").

An "administrative domain" or simply "domain" is a service provider holding a security repository permitting users to easily authenticate and authorize clients with credentials. A domain can pertain to one or more networks or network resources.

Representational State Transfer ("REST") is a style of software architecture for distributed systems such as the World Wide Web. REST-style architectures consist of clients and servers. Clients initiate requests to servers; servers process requests and return appropriate responses. Requests and responses are built around the transfer of representations of resources. A resource can be essentially any coherent and meaningful concept that may be addressed. A representation of a resource is typically a document that captures the current or intended state of a resource. In a REST architecture a client begins sending requests when it is ready to make the transition to a new state. While one or more requests are outstanding, the client is considered in transition. The representation of each application state contains links that may be used the next time the client chooses to initiate a new state-transition. REST can facilitate the transaction between web servers and other network resources by allowing loose coupling between different services.

An application programming interface ("API") is a protocol intended to be used as an interface by software components to communicate with each other. An API is a library that may include specification for routines, data structures, object classes, and variables. An API specification can take many forms, including an International Standard such as POSIX, vendor documentation such as the Microsoft Windows API, the libraries of a programming language, e.g. Standard Template Library in C++ or Java API.

Embodiments of the disclosure work in conjunction with search engines. More specifically, embodiments provide tools for collecting, tabulating, collating, analyzing and reporting on keywords entered into search engines by one or more users. In at least one example, a computer (also known as a fleet member or fleet resource, as will be explained in greater detail below), accesses a file containing a file which stores keyword-counters. When a search is performed by a search tool such as a search engine running on the computer, each time a keyword is used the counter for that keyword is incremented by one (1). For example, if the counter for the keyword "Amazon" had a value of 4 and the keyword "Amazon" is searched, then the counter for that keyword will be set to 5. If, on the other hand, a search is performed in which a keyword is used for the first time, a new counter for that keyword will be created and its value will be set to one (1). For example, if the keyword "bicycle carrier rack" is detected as being used in a search and "bicycle carrier rack" has not been searched previously (within a relevant period as will be discussed in greater detail), a keyword-counter for "bicycle carrier rack" will be established or created and its value will be set to one (1). The next time "bicycle carrier rack" is detected the counter will be incremented to two (2) and so on.

Various embodiments of the disclosure are discussed in detail below. While specific implementations are discussed, it should be understood that this is done for illustration purposes only. Various other functions and advantages are described and suggested below as may be provided in accordance with the various embodiments. A person skilled in the relevant art will recognize that other components and configurations may be used without departing from the scope of the disclosure.

Embodiments of the disclosure provide users with insight into the query or search activity in their domains. Embodiments of the disclosure enable continuous monitoring of the search engine logs for search events, (i.e., searches performed by search applications). Collected data regarding search events is used to derive various metrics, such as for example, the total number of queries performed in a relevant period, the total number of queries without results; the top N queries with counts; the top N queries which produced no results, with counts; and the top N documents in results, with counts. In at least one embodiment of the disclosure all such metrics are computed for a last full hour period and all metrics, except in some cases the top-N report, are available for user viewing on an hourly basis, while the top-N reports (e.g. top queries) shall are available on a daily basis. Other bases are included within this disclosure. Users are able to access the above-described metrics through one or more consoles within one or more network resources.

FIG. 1 illustrates an example environment 100 in which aspects of the various embodiments can be utilized. The example environment 100 can comprise at least one computing device 102, a network (e.g., Internet) 104, and a network based service 106. The computing device 102 can be communicatively connected to the network service 106 over the network 104. As shown in FIG. 1, there can also be a user of the computing device 102 or other entity (e.g., individual, company, organization, group, etc.) 108. The user or entity 108 can communicate data from the computing device 102 over the network 104 to the network service 106 (and vice versa).

In some embodiments, the network service 106 can be, can be part of, and/or can reside on one or more hosts or servers connected to the network 104. In some embodiments, the network service 106 can be associated with a service provider. For example, the service provider can provide a "pay-as-you-consume" storage service/space via the network service 106 to customers, such as the user of the device 102 or another entity (e.g., company, organization, group, individual, etc.) 108. Accordingly, the user/entity 108 of the computing device 102 can store data from the device 102 onto the network service 106 using the network 104. In other words, the user 108 and/or device 102 can utilize network based computing storage via the network service 106.

In one example, a computing device 102 can transmit data 110 over a network 104 to be stored on a network service 106, as shown in FIG. 1. The data 110 can be any data utilized in network based computing, such as for search, database storage, running an application, running a virtual machine, running an operating system, data related to electronic shopping, etc. The computing device 102 can transmit the data 110 to be stored on a network resource 112 provided by the network service 106. For example, the user/entity 108 can purchase or rent storage space on the service 106 and various services relating to network resource 112 can be allocated and assigned to the user/entity 108. In some embodiments, the user/entity 108 can have a particular account and/or storage allocation 114 on the service 106.

Figure 2:
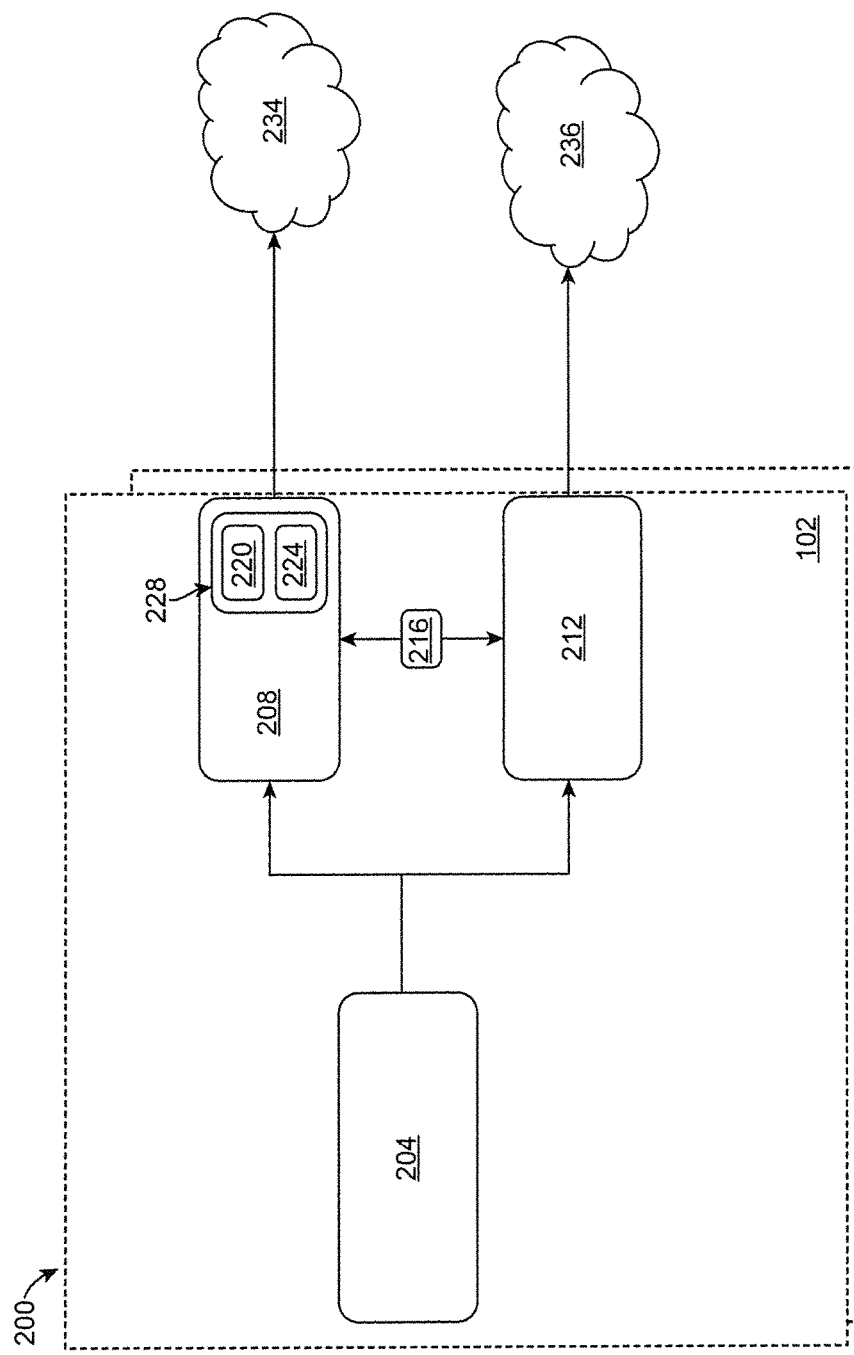
FIG. 2 illustrates an example of a data collection architecture of at least one embodiment of the disclosure.

FIG. 2 illustrates an example of a data collection architecture of at least one embodiment of the disclosure. A data collection system 200 consists of log collectors 204 and receivers 208, 212. The log collectors 204 accumulate events and notify the receivers 208, 212. The receivers 208, 212 can be event counters, or can perform complex analysis of events. The receivers 208, 212 are counter-based. For instance, the entity-count receivers 208 keep track of the count of individual entities (for example, how many searches were made for "ipod" in the last hour). In at least one embodiment, each metric (top queries, search counts, etc.) has its own receiver. Log collector 204 tails, tracks or follows local search engine log files (not shown) and parses them to extract search events and notifies the receivers 208, 212 regarding extracted and parsed information. Metric receivers 208 run on the search engine hosts 102 and listen for search events sent by the log collector 204. Each receiver 208 maintains two local counters, one counter which counts searches/search keywords which produce a search result and a counter which counts searches/search keywords which produce no search results. Each receiver keeps incrementing these local counters for each search event received. Upon receiving a command from receiver manager 216 to persist state, all receivers 208, 212, 220, 224 will increment counters stored in 234 by the amount of the local counters. Because it is possible that multiple receivers for the same domain can increment the persistent counters concurrently, in some embodiments, an atomic counter feature can be utilized to ensure data consistency between network resources 102, 234, 236.

In some embodiments, in order to manage collector's 204 resource usage, the collector 204 can be imbued with configurable limits such as those shown in the following table and discussed below.

TABLE 1

Collector Configurable Limits

| Name | Description | Default |
| --- | --- | --- |
| PollingInterval | Query log tail interval in seconds | One second. |
| MaxNumReads | Number of reads per tail interval. | 10 |
| MaxReadSize | Size of each read in bytes. | 32K |
| LogDirectory | Base directory of log files | "$ROOT/var/output/logs" |
| LogFileName | Name of the log file to tail | "service_log" |

In at least one embodiment of the disclosure, a log collector 204 has a tailing algorithm. At the start of the program, the algorithm instantiates a log collector 204. The log collector 204 runs at least once every period (for example PollingInterval) using a timer task, the length of the period being configurable. If a log collector 204 is not tailing a log file upon instantiation, log collector 204 will open a log file and set the value of a tracking variable (for example, "filePosition") to zero (0); those skilled in the art will recognize that filePosition is a pointer. Each time the timer-scheduled algorithm runs, the algorithm will determine if the current hour is the same as the hour the log collector 204 started monitoring the log file. If they are the same, log collector 204 will make a maximum of MaxNumReads file reads starting from filePosition, with each reading taking in up to MaxReadSize bytes. The read bytes are parsed, search events are extracted and the collectors 204 are notified. In order to help ensure that data is not improperly read more than once, filePosition is incremented by the number of bytes read. On the other hand, if the hours are different, this means that collector 204 file has rolled over and a new data collection cycle has begun. The current collector 204 will therefore retain the previous hour's data file handle and keep reading until it reaches the end of file. On reaching the end of file, the collector 204 will stop its timer and close the file. Thereafter, a new log collector 204 will be instantiated which will start tailing the new log file. As should be understood by those skilled in the art, the algorithm can be set to run at other suitable intervals.

In at least one embodiment of the disclosure, a receiver manager 216 is responsible for creating single instances of each required receiver type and also for scheduling a periodic flush of the data collected in these receivers 208, 212 to persistent store. Receiver manager 216 can be configured to construct each of the required receivers 208, 212. Receiver manager 216 can include a host timer (not shown) which invokes a coordinated flush of every receiver's 208, 212 data store contents to a storage resource, such as Amazon S3 for example. (See Amazon CloudSearch Developer Guide, API Version 2011-02-01.) The flush interval can be set to 30 minutes or another suitable interval. Flushing of the data across all stores (for example, device 102) can be synchronized to enable a recovery mechanism for the case of the unexpected death of the analytics collector application 204. Thus, in some embodiments, the collector application 204 can retrieve the time of last flush and begin scanning logs at the appropriate location.

As illustrated in the embodiment shown FIG. 2, at least two "Entity-Count" data receivers 220, 224 can reside on each search engine 228 within a member of a domain's search fleet 102. Unique query receiver 220 collects unique query counts. Unique Document Receiver 224 collects unique document counts. Each receiver 208, 212 takes search event data from log collector 204, collects counts, and periodically flushes partial-totals to a network resource 236, such as S3, as described above. In the embodiment of FIG. 2, there are two data stores (not shown) per receiver 220, 224. One receiver, for example 220, is active, while the other, for example 224, has its contents sent, transmitted, or pushed to network resource 236 (e.g., 112). Data stores can include, but are not limited to a top-queries store, which can store total occurrences of keywords, and occurrences of keywords with no-results, and a top-documents store, which can store the number of occurrences that a particular document is returned as a search result. Data stores such as these can be implemented using a software library such as BerkeleyDB, for example. These data stores can be indexed by key, using a B-Tree access method to support key-ordered traversal on flush, for example.

As will be discussed in greater detail below, for each search event received from log collector 204, if a keyword-counter is already present in an active collector store, the system 200 will increment all appropriate counter(s). If a keyword-counter is not present, one will be created for the searched keyword and the system 200 will insert the counter with count=one (1).

As described above, collected search event data is periodically uploaded by the system 200. Upon a command from receiver manager 216 to flush stored data, receiver 208 moves "active" collector store offline for pushing to network resource 236 and replaces with empty store. The system 200 pushes store contents ("partial totals") to network resource 236. In at least one embodiment, data can be written to the partial total files in key-order to help facilitate the efficient merging of partial totals data into running periodic (for example, daily) totals, as will be discussed below. For each partial totals file which is uploaded to 236, related metadata can be added to a table in network resource 234, in order to accurately keep track of those files which are yet to be processed.

Figure 3:
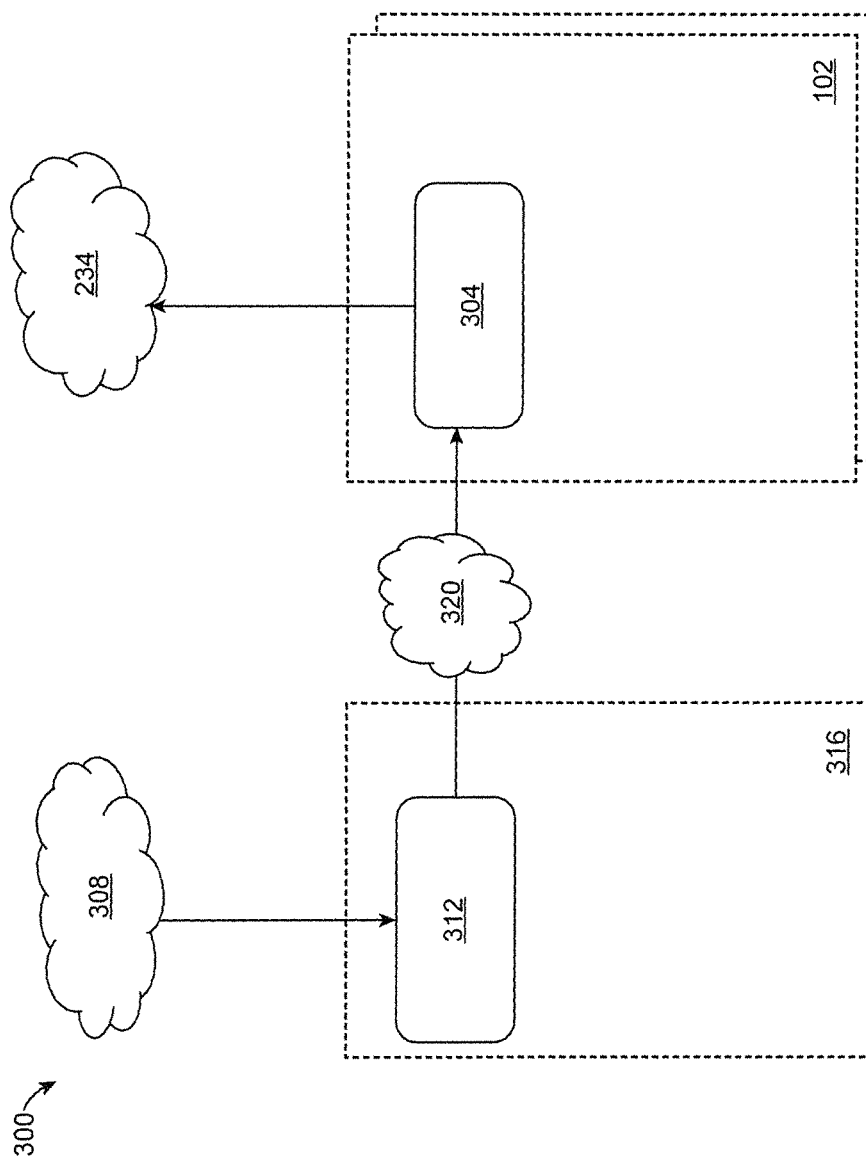
FIG. 3 illustrates an example application programming interface (API) layer 300 of at least one embodiment of the disclosure.

FIG. 3 illustrates an example application programming interface (API) layer 300 of at least one embodiment of the disclosure. An analytics reporting service API 304 can consist of a per-domain Representational State Transfer (REST) service running on a network resource 102 within a customer's 308 search domain, i.e., on each device executing a search and configured with an analytic system as disclosed herein. A console 312, such as a CloudSearch AWS Console, can be utilized by a customer 308 to request and view reports relating to search data as collected and synthesized by embodiments of this disclosure. The console 312 can be implemented by a web application such as Apache Tomcat, for example. In order for console users (i.e., customers 308) to access their analytics from console 312, a servlet running on the console server 316 can be implemented to serve as a proxy for requests to a search analytics reporting service (not shown). As shown in FIG. 3, at least one load balancer 320 can be interposed between a console server 316 and a fleet member-network resource 102. The ELB 320 can be shared with the search and document services of this disclosure. API 304 can be configured to return search metrics for a given domain (which may be comprised by one or more fleet member-network resources 102) for specified time period.

Figure 4:
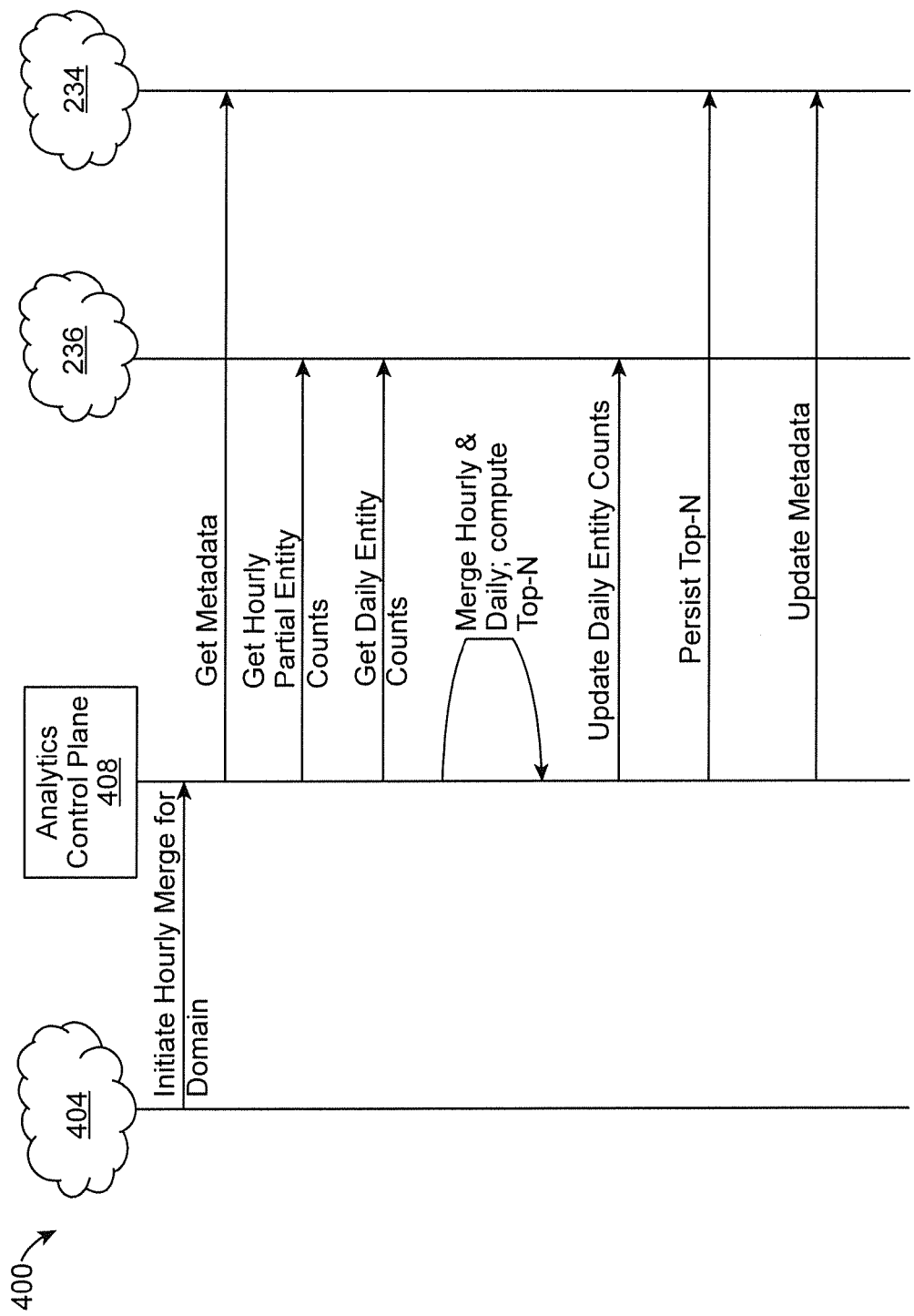
FIG. 4 illustrates the flow of an example embodiment of a top-N merge process 400.

FIG. 4 illustrates the flow of an example embodiment of a top-N merge process 400. As discussed above, partial-totals of keyword-search data are uploaded periodically from fleet members such as 102 to network resources such as 234 and 236. This data is in turn periodically merged in one or more top-N merge processes. A top-N merge process is invoked by a workflow controller 404 (such as Amazon's SWF) to merge newly arrived data from fleet data collectors into one or more previously running daily totals from earlier merge operations. Controller 404 operates via an analytics control plane 408 to control steps in the process 400. This merge process can update top-N entity data in a network resource 234 for the API 304 to serve to at least one customer 308. As noted above, at least two merge processors can be employed to perform a top-N merge. A top-N documents merge processor merges data for the N-most commonly found documents. A top-N queries merge processor merges data for both unique queries which produce search results and unique queries which produce no search results. Inputs for this process comprise the set of n-number (where n is a positive integer) partial-totals files produced by flushes of search engine-resident top-N Receivers since last merge of data in network resource 236, such as S3 for example. Inputs also comprise metadata on consistent store lists of unprocessed daily partials files stored in network resource 234. Inputs for the top-N merge process also comprise the previously accumulated daily totals file stored at 236 which holds count data for every entity 102 already collected and synthesized from earlier merges in the day. Inputs for this process further include at least one metadata record on a consistent store which indicates that the latest daily-totals file has been successfully pushed to 234. Outputs of process 400 include updated accumulated daily-totals (counts for every entity seen, 102), stored as a data set on 236, updated top-N entity data in 236 and updated metadata records for all consumed partial-totals files and recently-produced daily-totals files.

FIGS. 5-8 illustrate various methods implemented by various embodiments of this disclosure. With regard to these methods, it should be understood that there can be additional, fewer, or alternative steps performed in similar or alternative orders, or in parallel, within the scope of the various embodiments unless otherwise stated.

Figure 5:
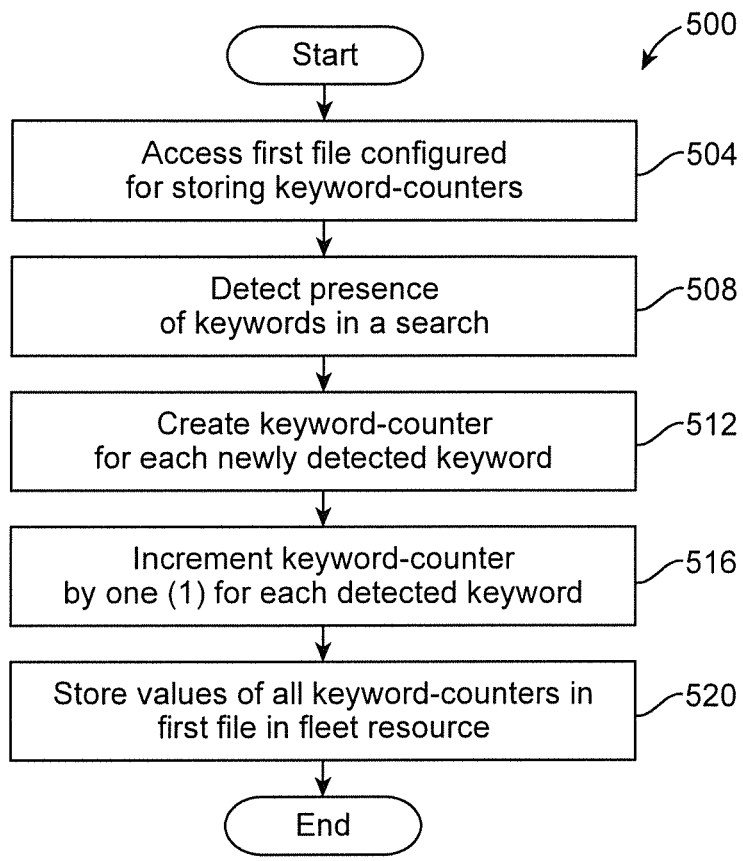
FIGS. 5-9 illustrate various methods implemented by various embodiments of this disclosure.

FIG. 5 illustrates an example method 500 in accordance with at least one embodiment of the disclosure. The method 500 begins at step 504, where a first file configured for storing keyword-counters is accessed in a fleet resource such as a personal computer running a search engine. The method 500 then continues to step 508, where the system 200 detects the presence of keywords in a search in the fleet resource. The method 500 then continues to step 512. At step 512, the system 200 creates a keyword-counter for each keyword newly detected in step 508. The method 500 then proceeds to step 516. At step 516 the system 200 increments the keyword-counter by one (1) for each detected keyword in step 508 which was not new. The method 500 then proceeds to step 520. In step 520, the system 200 stores the values of all keyword-counters in a first file in a fleet resource. The method 500 then ends. In at least one embodiment, the method can be performed iteratively or periodically.

Figure 6:
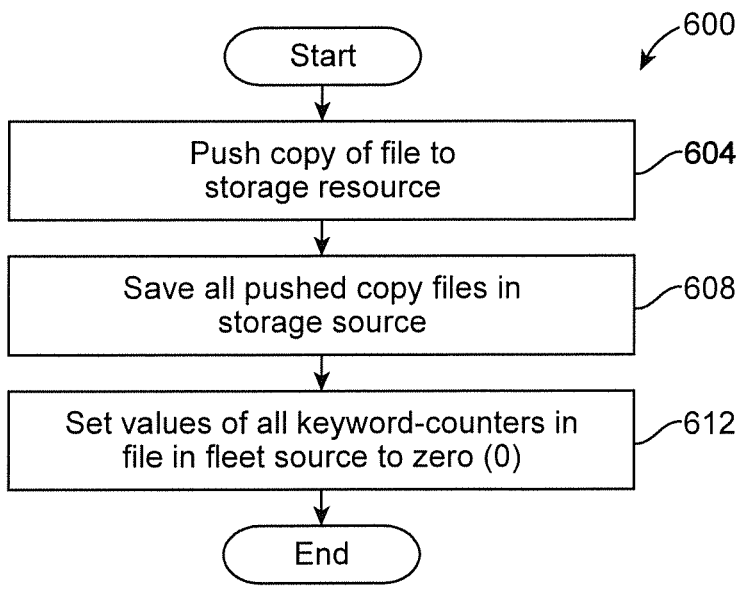

FIG. 6 illustrates another example method 600 in accordance with at least one embodiment of the disclosure. Method 600 can be performed in relation to method 500. The method 600 begins at step 604, wherein a copy of a first file (such as that from step 520 above) is pushed to a storage resource. The method 600 then continues to step 608. In step 608 the pushed copy files are saved in the storage source. The method 600 then continues to step 612. In step 612, the values of all the keyword-counters in the file in the fleet source to zero (0). The method 600 then ends. In at least one embodiment, the method 600 can be performed iteratively or periodically.

Figure 7:
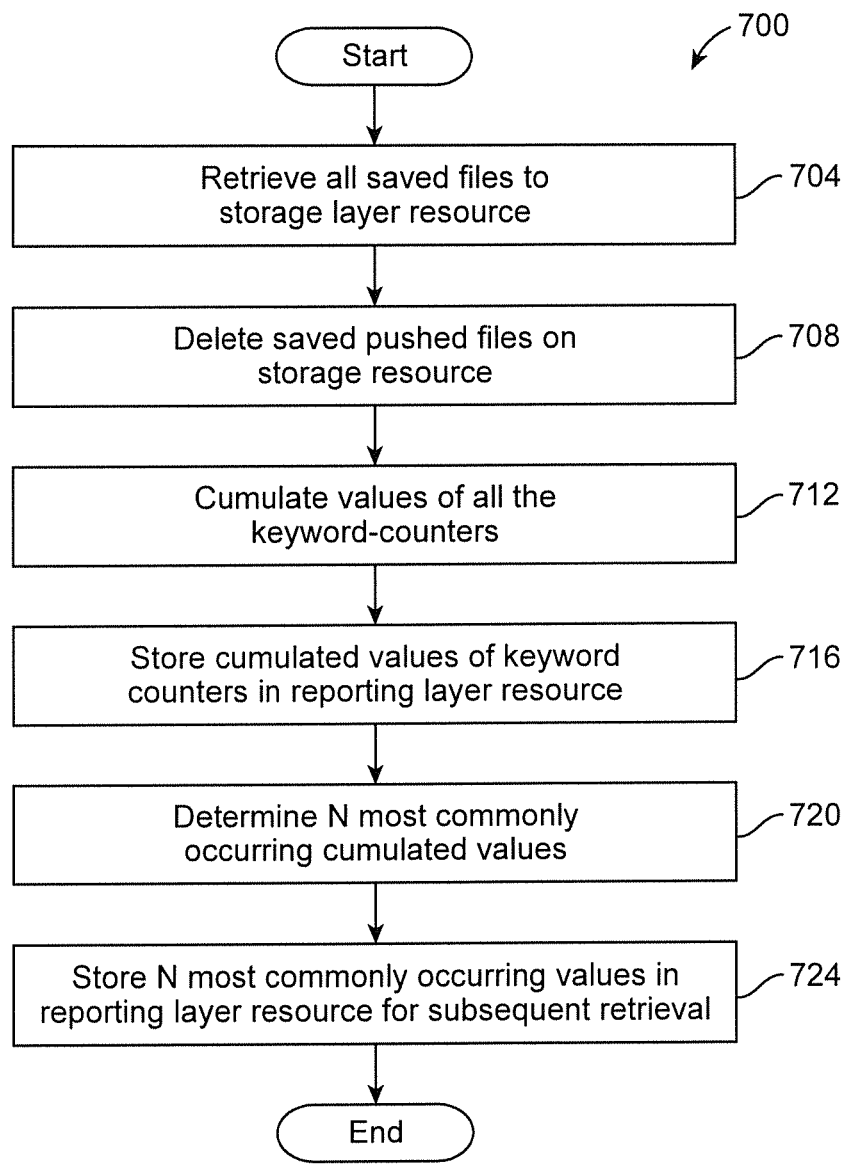

FIG. 7 illustrates another example method 700 in accordance with at least one embodiment of the disclosure. Method 700 can be performed in relation to method 500 and method 600. Method 700 begins at step 704 wherein the system 200 retrieves the previously saved files to a reporting layer resource. The method 700 then proceeds to step 708, wherein the previously saved pushed files the storage resource are deleted or cleared. The method 700 then proceeds to step 712. At step 712, all of the values of all the keyword-counters in the reporting layer resource are cumulated. The method 700 then proceeds to step 716, in which the cumulated values of the keyword-counters from step 712 are stored in the reporting layer resource. The method can then proceed to step 720. At step 720, the system 200 determines the N most commonly occurring cumulated values. The method 700 then proceeds to step 724. At step 724 the N most commonly occurring values are saved or stored in the reporting layer resource for subsequent retrieval by a system customer 308. The method 700 then ends. In at least one embodiment, the method 700 can be performed iteratively or periodically.

Figure 8A:
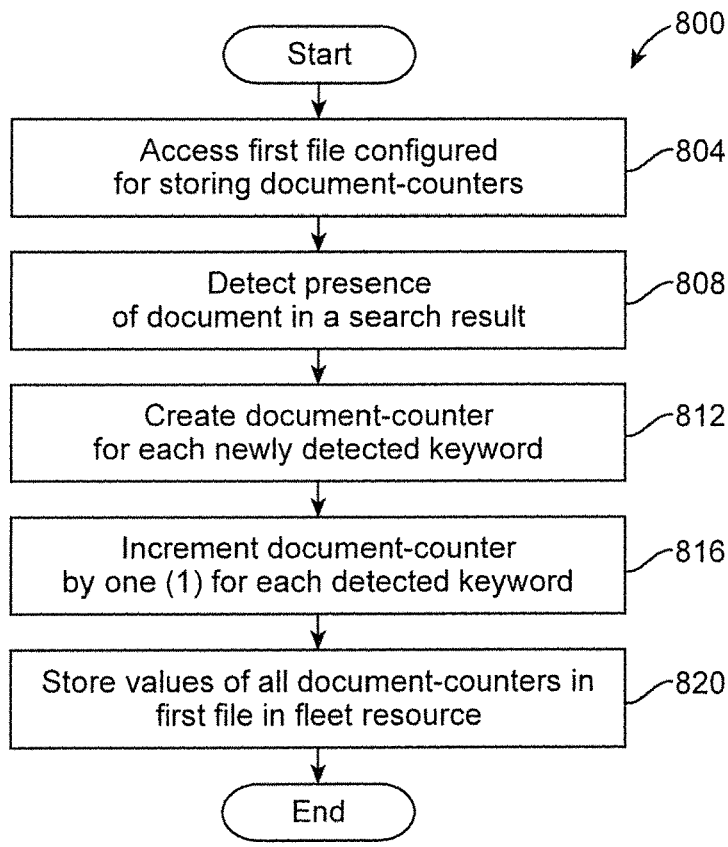

FIG. 8A illustrates an example method 800 in accordance with at least one embodiment of the disclosure. The method 800 begins at step 804, where a first file configured for storing document-counters is accessed in a fleet resource such as a personal computer running a search engine. The method 800 then continues to step 808, where the system 200 detects the presence of a document in a search result returned by a search in the fleet resource. The method 800 then continues to step 812. At step 812, the system 200 creates a document-counter for each document newly detected in step 808, and sets the value of the counter to an initial value. The method 800 then proceeds to step 816. At step 816 the system 200 increments the document-counter by one (1) for each detected document in step 808 which was not new. The method 800 then proceeds to step 820. In step 820, the system 200 stores the values of all document-counters in a first file in a fleet resource. The method 800 then ends. In at least one embodiment, the method can be performed iteratively or periodically.

Figure 8B:
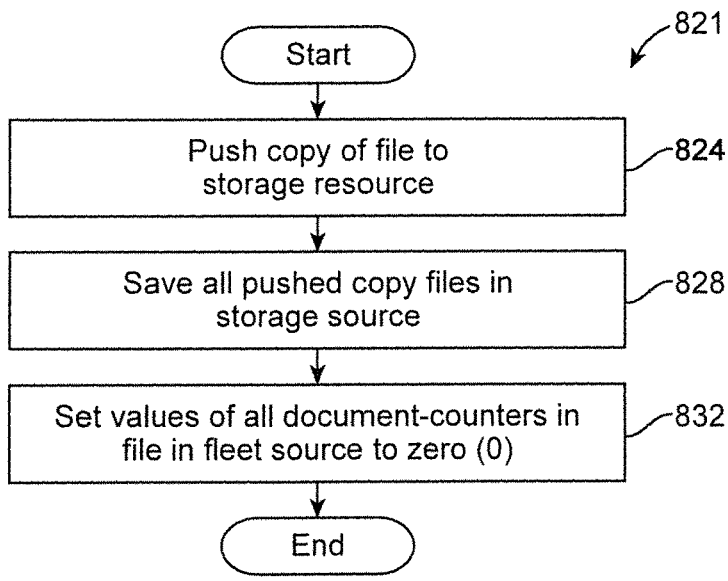

FIG. 8B illustrates another example method 821 in accordance with at least one embodiment of the disclosure. Method 821 can be performed concurrently or in series with method 800. The method 821 begins at step 824, wherein a copy of a first file (such as that from step 820 above) is pushed to a storage resource. The method 821 then continues to step 828. In step 828 the pushed copy files are saved in the storage source. The method 821 then continues to step 832. In step 832, the values of all the document-counters in the file in the fleet source to zero (0). The method 821 then ends. In at least one embodiment, the method 821 can be performed iteratively or periodically.

Figure 8C:
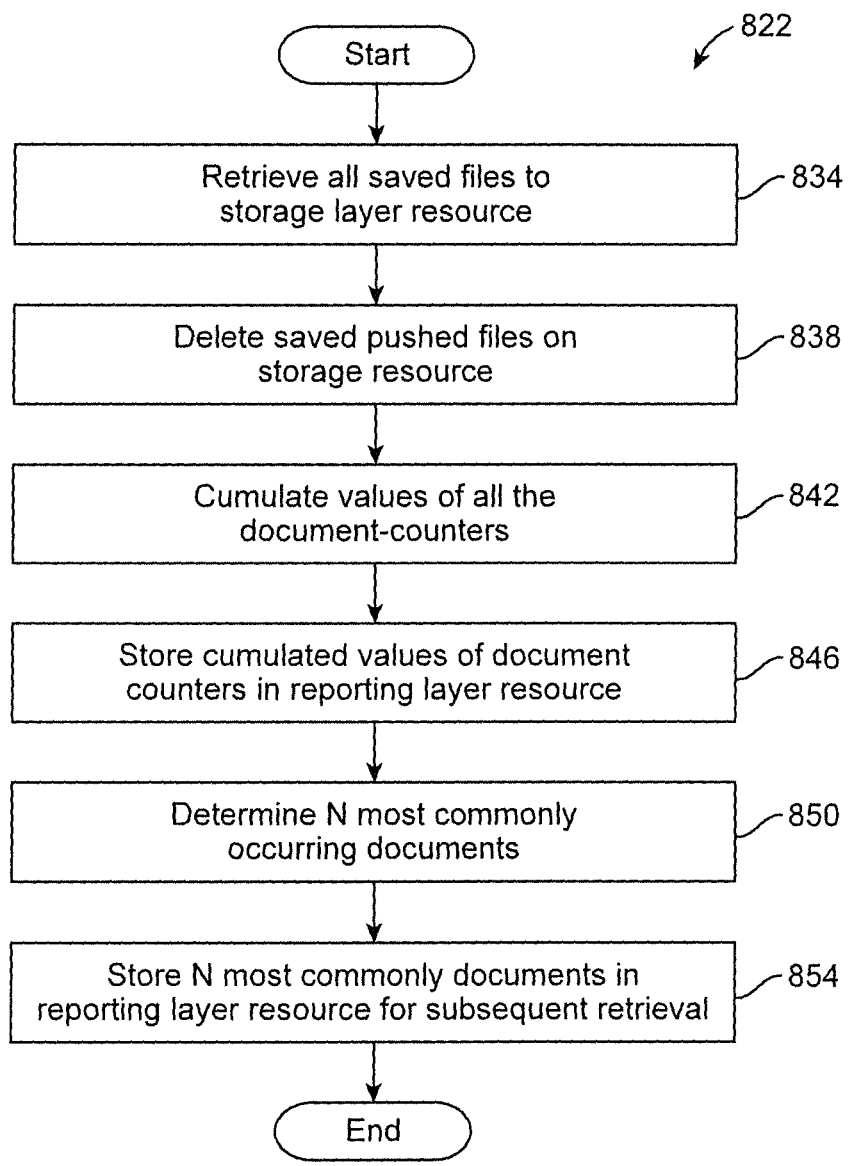

FIG. 8C illustrates another example method 822 in accordance with at least one embodiment of the disclosure. Method 822 can be performed in relation to method 800 and method 821. Method 822 begins at step 834 wherein the system 200 retrieves the previously saved files to a reporting layer resource. The method 822 then proceeds to step 838, wherein the previously saved pushed files the storage resource are deleted or cleared. The method 822 then proceeds to step 842. At step 842, all of the values of all the document-counters in the reporting layer resource are cumulated. The method 822 then proceeds to step 846, in which the cumulated values of the document-counters from step 842 are stored in the reporting layer resource. The method can then proceed to step 850. At step 850, the system 200 determines the N most commonly occurring cumulated values. The method 822 then proceeds to step 854. At step 854 the N most commonly occurring values are saved or stored in the reporting layer resource for subsequent retrieval by a system customer 308. The method 822 then ends. In at least one embodiment, the method 822 can be performed iteratively or periodically.

Figure 9:
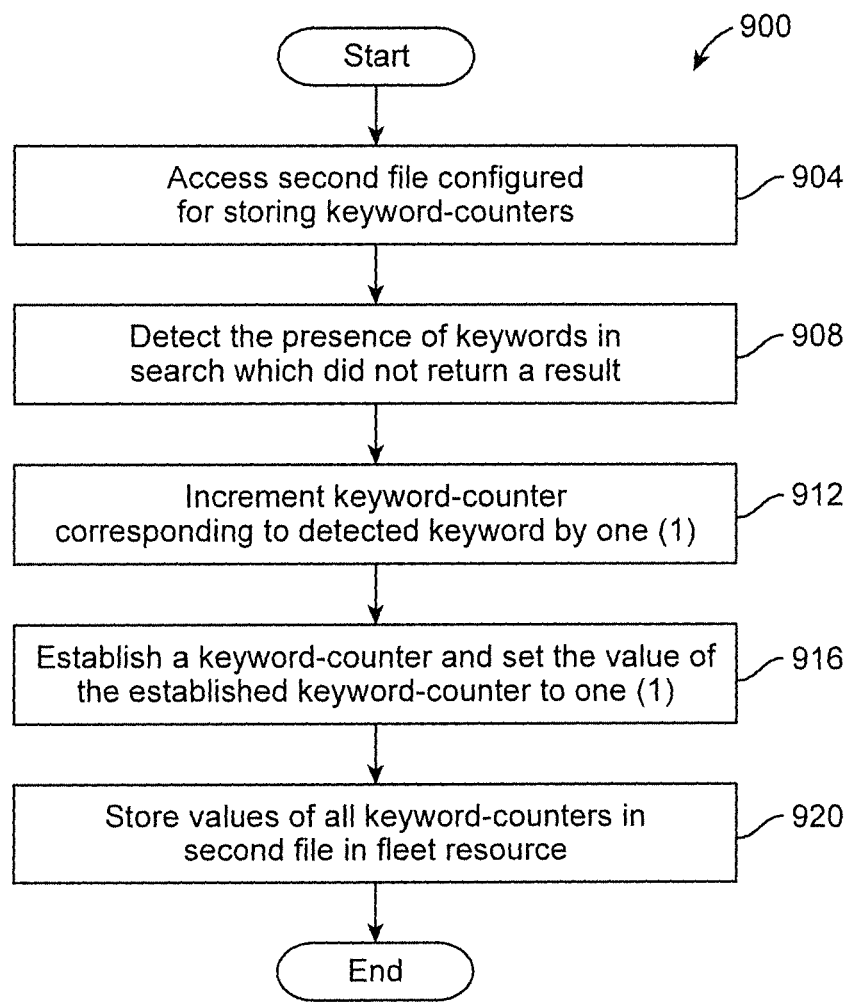

FIG. 9 illustrates another example method 900 in accordance with at least one embodiment of the disclosure. Method 900 can be performed in relation to method 500, method 600, method 700, method 800, method 821 and method 822. Method 900 starts at step 904, wherein a second file configured for storing keyword-counters is opened. The method 900 then proceeds to step 908. In step 908, the system 200 detects the presence of keywords in a search which did not return a result. The method 900 then proceeds to step 912. In step 912, the system 200 increments the keyword-counter for each detected keyword from step 908. The method 900 then proceeds to step 916. At step 916, for each newly detected keyword from step 908, the system establishes a keyword-counter and sets the value of the established keyword-counter to one (1). The method 900 then proceeds to step 920. At step 920, the system stores the values of all the keyword-counters from the previous steps in a second file in a fleet resource. The method 900 then ends. In at least one embodiment, the method 900 can be performed iteratively or periodically.

Figure 10:
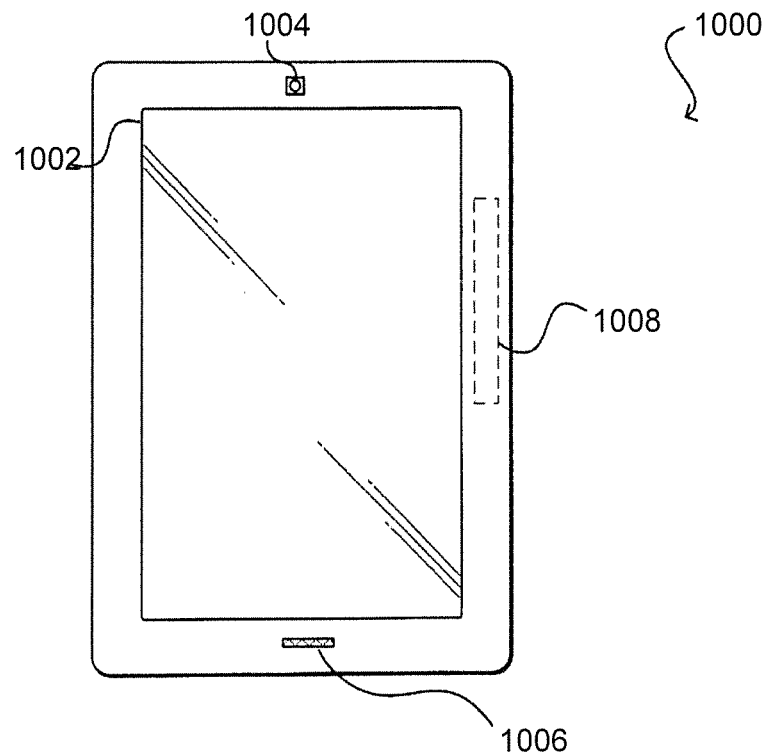
FIG. 10 illustrates an example electronic user device 1000 that can be used in accordance with various embodiments of the disclosure.

FIG. 10 illustrates an example electronic user device 1000 that can be used in accordance with various embodiments of the disclosure. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device 1000 can be an analog device, such as a device that can perform signal processing using operational amplifiers. In this example, the computing device 1000 has a display screen 1002 on the front side, which under normal operation will display information to a user facing the display screen (e.g., on the same side of the computing device as the display screen). The computing device in this example includes at least one camera 1004 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1000 also includes at least one microphone 1006 or other audio capture device capable of capturing audio data, such as words or commands spoken by a user of the device. In this example, a microphone 1006 is placed on the same side of the device as the display screen 1002, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1000 also includes at least one orientation sensor 1008, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 11:
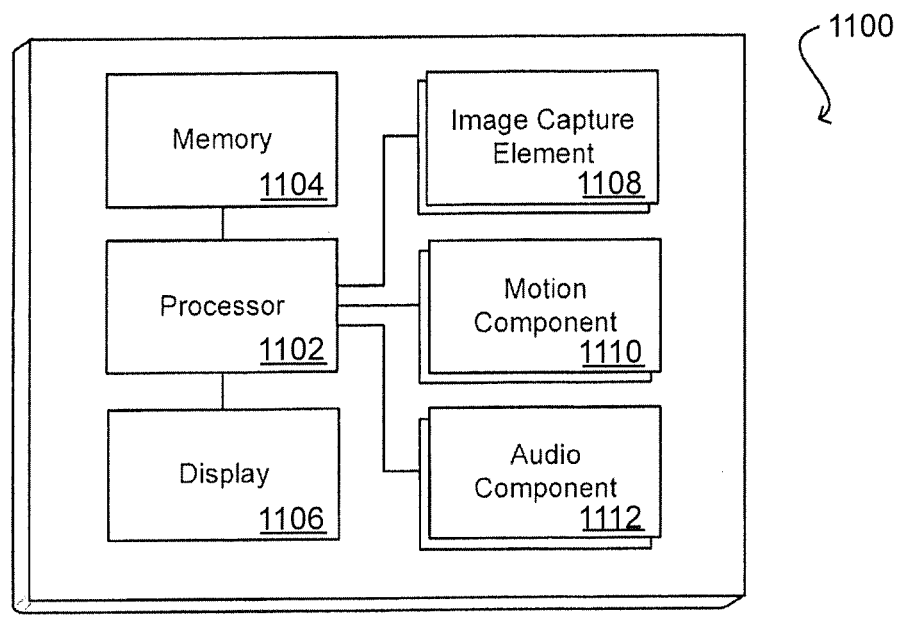
FIG. 11 illustrates a logical arrangement of a set of general components of an example computing device 1100 such as the device 1000 described with respect to FIG. 10.

FIG. 11 illustrates a logical arrangement of a set of general components of an example computing device 1100 such as the device 1000 described with respect to FIG. 10. In this example, the device (for example, 102) includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one image capture element 1108 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1112, such as a mono or stereo microphone or microphone array, operable to capture audio information from at least one primary direction. A microphone can be a unidirectional or omnidirectional microphone as known for such devices.

In some embodiments, the computing device 1100 of FIG. 11 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1100 also can include at least one orientation or motion sensor 1110. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1102, whereby the device can perform any of a number of actions described or suggested herein.

As an example, a computing device such as that described with respect to FIG. 10 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 12:
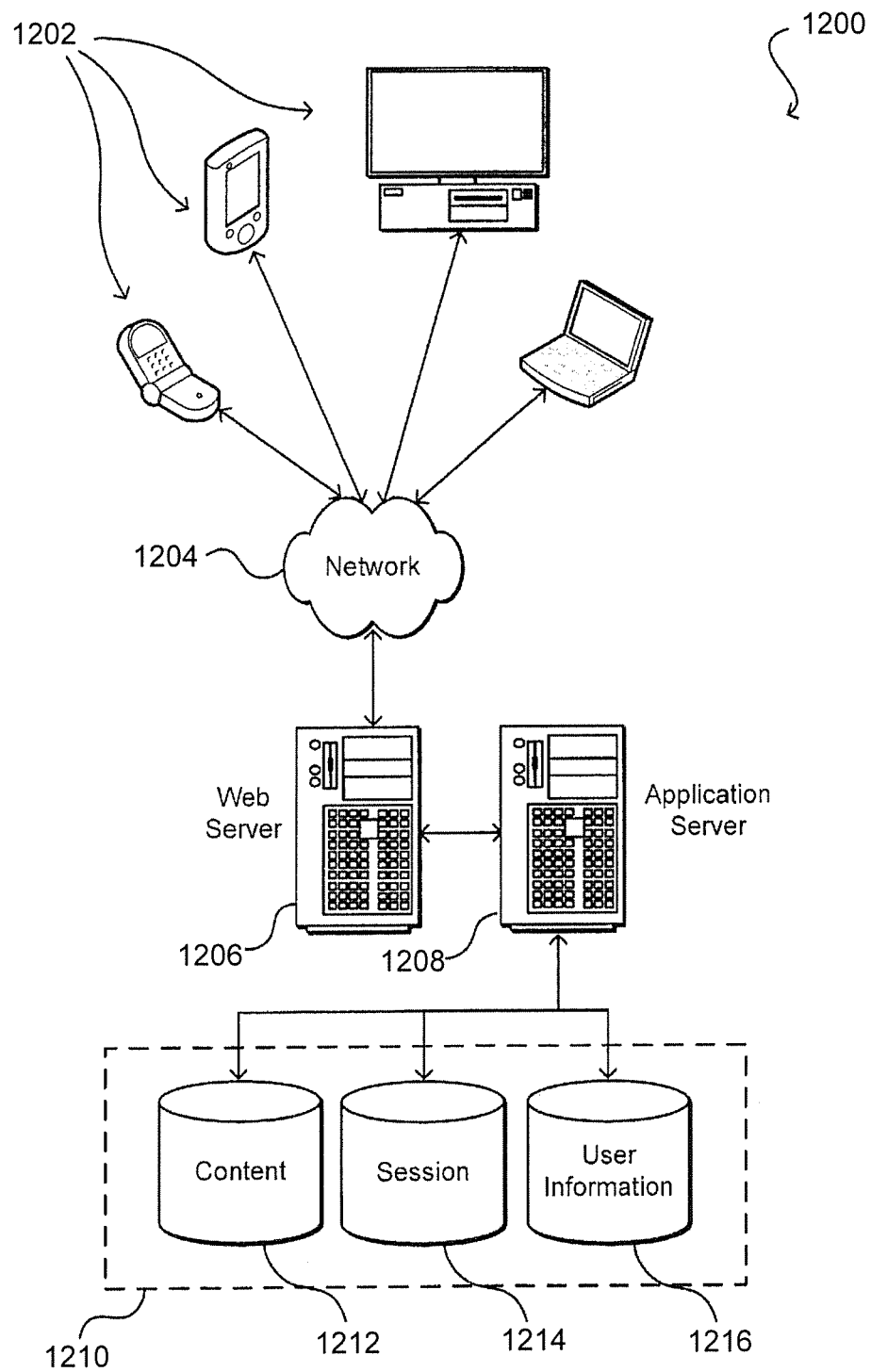
FIG. 12 illustrates an example of an environment 1200 for implementing aspects in accordance with various embodiments of the disclosure.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log or session data 1214. It should be understood that there can be many other aspects that may need to be stored in the data store 1210, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1202. Information for a particular element of interest can be viewed in a dedicated page or window of the browser.

Each server within this disclosure typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

As discussed above, embodiments of the disclosure pertain to one or more computer-implemented methods for analyzing keyword searches. In at least one embodiment, a network resource such as a computer can access a first file which stores one or more keyword-counters. The network resource will detect keywords in searches as they are performed. For each detected keyword which corresponds to an accessed keyword-counter, the network resource will increase the value of the corresponding keyword-counter by one (1). For each detected keyword which does not correspond to a keyword-counter in the file, the resource will establish a keyword-counter and will the value of the established keyword-counter to one (1) or some other suitable predefined value. The resource will then store the values of all keyword-counters either locally or in another network resource. Each time a search is performed by the resource, new counters are created for each new keyword and corresponding counters are incremented each time a previously searched keyword is searched again. It will be understood that these steps can be performed by multiple network resources concurrently.

In at least one embodiment of the disclosure, a copy of the file created as in the preceding paragraph can be sent to a storage resource. The storage resource can save copies of such files sent from multiple other network resources. After a (keyword-counter value) file is received from the network source that sent it and the file has been saved on, for example a storage resource, the values of all the keyword-counters in the file in the fleet source can be reset to zero (0) or some other suitable value.

In at least one embodiment of the disclosure, all of the counter data files saved to one or more storage resource(s) can be retrieved to a reporting layer resource and saved there. Once all of such files have been saved to the third resource, all of the saved files on the storage resource can be cleared, flushed or deleted. Thereafter, the values of all keyword-counters from the counter files on the third resource can be cumulated. For example, if one file contained a counter for "Amazon" with a value of 5 and another had a value of 4, the resulting cumulated value for the counter corresponding to the keyword "Amazon" would be 9. This type of cumulating can be performed for all the values in all the files, which will then indicate the number of times a particular keyword was searched by every one of the network resources described above. Cumulated values for all of the evaluated keyword-counters can then be stored in the reporting layer resource or in another suitable location.

In at least one embodiment of the disclosure, a determination can be performed to identify the N-most commonly occurring cumulated values, where N can be any positive integer. Thus, for example, a determination can be made as to what were the fifty (N=50) most commonly searched terms in previous cycle. The N most commonly occurring values can be stored in a reporting layer resource for subsequent retrieval.

In at least one embodiment of the disclosure, instructions for analyzing keyword searches submitted by a user can be included in a non-transitory computer-readable storage medium. Here, the instructions, when executed by a computing system processor, can cause the computing system to receive information relating to the keyword search, detect whether one or more keywords are in the search, and determine whether each of the detected keywords corresponds to one of a plurality of accessed keyword counters which indicate the number of time the keyword was received in a search. If the keywords searched correspond to one of a plurality of accessed keyword counters, the counter for that keyword is incremented by one (1). If, on the other hand, a search is performed in which a keyword is used for the first time, a new counter for that keyword will be created and its value will be set to one (1). The values of all keyword counters are stored in a first file in a fleet resource.

In at least one embodiment of the disclosure, the instructions discussed above can further cause the system to send a copy of the first file to a storage resource and save all copied files in the storage resource. Once the copied files have been saved in the storage resource, the values of the keyword counters in the first file in the fleet resource can be set to zero (0).

In at least one embodiment of the disclosure, the instructions discussed above can further cause the system to retrieve all of the saved files to a reporting layer resource. Once accomplished, the saved sent files can be deleted from the storage resource. The values of the keyword counters can then be cumulated and their corresponding cumulated values can be stored in the reporting layer resource. The N most commonly occurring cumulated values can then be determined and stored for subsequent retrieval in the reporting layer resource.

In at least one embodiment of the disclosure, the instructions discussed above can further cause the system to perform during a timed event. Here, a timer is first set to a value of zero (0). Then, the system can retrieve all of the files saved to the reporting layer resource. Next, the saved sent files can be deleted from the storage resource. The values of the keyword counters can then be cumulated and their corresponding cumulated values can be stored in the reporting layer resource. The N most commonly occurring cumulated values can then be determined and stored for subsequent retrieval in the reporting layer resource until the value of the counter timer corresponds to an endpoint time stipulated in the timed event.

In at least one embodiment of the disclosure, the instructions discussed above can further cause the system to access a second file configured for storing keyword counters and detect the presences of keywords in a search for which a search result was not returned. Here, if the keywords searched correspond to one of an accessed keyword counter, the counter for that keyword is incremented by one (1). If, on the other hand, a search is performed in which a keyword is used for the first time, a new counter for that keyword will be created and its value will be set to one (1). The values of all keyword counters are stored in the second file in the fleet resource.

In at least one embodiment of the disclosure, the instructions discussed above can further cause the system to send a copy of the second file to a storage resource and save all copied files in the storage resource. Once the copied files have been saved in the storage resource, the values of the keyword counters in the second file in the fleet resource can be set to zero (0).

In at least one embodiment of the disclosure, the instructions discussed above can further cause the system to retrieve all of the saved files to the reporting layer resource. Once accomplished, the saved sent files can be deleted from the storage resource. The values of the keyword counters can then be cumulated and their corresponding cumulated values can be stored in the reporting layer resource. The N most commonly occurring cumulated values can then be stored for subsequent retrieval in the reporting layer resource. Further, the cumulated values of all keyword-counters for which a search result was not returned can be stored for subsequent retrieval in the reporting layer resource.

In at least one embodiment of the disclosure, the instructions discussed above can further cause the system to perform during a timed event. Here, a timer is first set to a value of zero (0). Then, the system can retrieve all of the files saved to the reporting layer resource. Next, the saved sent files can be deleted from the storage resource. The values of the keyword counters can then be cumulated and their corresponding cumulated values can be stored in the reporting layer resource. The N most commonly occurring cumulated values can then be stored for subsequent retrieval in the reporting layer resource until the value of the counter timer corresponds to an endpoint time stipulated in the timed event. Further, the cumulated values of all keyword-counters for which a search result was not returned can be stored for subsequent retrieval in the reporting layer resource until the value of the counter timer corresponds to an endpoint time stipulated in the timed event.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Pert, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the scope of the following claims.

What is claimed is:

1. A computer-implemented method, comprising:
receiving, from a fleet resource, a search request for a keyword stored in a storage resource of keywords;
analyzing the storage resource of keywords to determine a first number of occurrences of the keyword;
associating the first number of occurrences with a first keyword-counter value;
storing the first keyword-counter value in a first file in the fleet resource;
saving a copy of the first file to a reporting layer resource, the storage resource of keywords remote from the fleet resource and the reporting layer resource;
detecting that a search result was not returned for the search request, indicating that the keyword was not found within the storage resource of keywords;
incrementing a second keyword-counter value associated with the keyword, the second keyword-counter value indicating a second number of occurrences the keyword was used in a search for which a search result was not returned;
storing the second keyword-counter value in a second file in the fleet resource;
saving a copy of the second file to the reporting layer resource;
deleting the first file and the second file from the fleet resource after the copy of the first file and the copy of the second file are saved to the reporting layer resource; and
associating at least the first keyword-counter value in the first file and the second-keyword counter value in the second file in the fleet resource to an initial value of zero after saving the copy of the first file and the copy of the second file.

2. The computer-implemented method of claim 1, wherein the reporting layer resource receives files with a plurality of keyword-counter values corresponding to a plurality of keywords from multiple network resources, and wherein the reporting layer resource is capable of determining calculating a cumulated keyword-counter value for the keyword over a time interval, the time interval determined using at least one timer.

3. The computer-implemented method of claim 1, further comprising:
    retrieving the copy of the first file from the reporting layer resource;
    deleting the copy of the second file on the storage resource;
    storing a cumulated keyword-counter value for the keyword from the copy of the first file;
    determining N highest cumulated values; and
    storing the N highest cumulated values in the reporting layer resource for subsequent retrieval.

4. The computer-implemented method of claim 1, further comprising:
    accessing the copy of the second file saved on the storage resource;
    detecting a new keyword in the search that did not return a result;
    set a new keyword-counter value for the new keyword to one (1); and
    storing the new keyword-counter value for the new keyword in the second file in the fleet resource.

5. The computer-implemented method of claim 1, further comprising:
    retrieving a subset of saved files to the reporting layer resource;
    deleting the subset of saved files on the storage resource;
    cumulating the values of a subset of the keyword-counters;
    storing the cumulated values of the subset of the keyword-counters in the reporting layer resource;
    determining N highest cumulated values;
    storing, in the reporting layer resource, the N highest cumulated values; and
    storing, in the reporting layer resource, the cumulated values of the subset of keyword-counters for which a search result was not returned.

6. A computer-implemented method comprising:
    receiving a search that includes a keyword, the search for the keyword in a computing device, the computing device storing a plurality of documents;
    analyzing a storage resource of documents to determine a first number of documents containing the keyword in a search result;
    associating the first number of documents with a first keyword-counter value;
    storing the first keyword-counter value in a first file in a resource;
    saving a copy of the first file to a reporting layer resource, the storage resource of documents remote from the resource and the reporting layer resource;
    detecting that a search result was not returned for the search indicating that the keyword was not found within the plurality of documents stored on the computing device;
    incrementing a second keyword-counter value associated with the keyword, the second keyword-counter value indicating a second number of documents the keyword was used in a search for which a search result was not returned;
    storing the second keyword-counter value in a second file in the resource;
    saving a copy of the second file to the reporting layer resource; and
    associating at least the first keyword-counter value in the first file and the second-keyword counter value in the second file in the resource to an initial value of zero after saving the copy of the first file and the copy of the second file.

7. The computer-implemented method of claim 6, further comprising:
    determining a cumulated value of keyword-counters for which a search result was not returned within a relevant time period; and
    storing in the reporting layer resource, for subsequent retrieval, the cumulated value of the keyword-counters for which a search result was not returned.

8. The computer-implemented method of claim 6, further comprising:
    retrieving, over a relevant time period, the second file containing keyword-counter values;
    determining whether each keyword corresponds to a keyword-counter, each keyword-counter indicating a number of times the corresponding keyword was received in the search, the determining based at least in part on information relating to the search;
    for each keyword corresponding to a keyword-counter, incrementing the corresponding keyword-counter;
    for each keyword which does not correspond to a keyword-counter, establishing a keyword-counter and setting the value of the established keyword-counter to one (1); and
    storing a respective value of all keyword-counters in the second file in the resource.

9. The computer-implemented method of claim 8, wherein retrieving, over the relevant time period, the second file containing keyword-counter values further comprises:
    sending a copy of the second file to a storage resource;
    saving the copy of the second file to the storage resource; and
    setting the respective value of all keyword-counters in the second file in the storage resource to zero (0).

10. The computer-implemented method of claim 6, further comprising:
    collecting data regarding search events occurring within multiple locations;
    periodically cumulating keyword-counter values based on the collected data;
    determining a first number of search events, occurring over a relevant time period, producing search results and a second number of search events not producing search results; and
    determining at least one of N highest cumulated keywords or N highest cumulated documents produced by the search events in the relevant time period.

11. The computer-implemented method of claim 10, wherein periodically cumulating keyword-counter values based on the collected data comprises:
    setting the value of a timer to an initial value;
    retrieving a subset of the saved files to the reporting layer resource;
    deleting a subset of the saved sent files on the storage resource of documents;
    cumulating the values of a subset of the keyword-counters;
    storing the cumulated values of the keyword-counters in the reporting layer resource;

determining N highest cumulated values; and storing the N highest cumulated values in the reporting layer resource for subsequent retrieval, until the value of the timer corresponds to a time T.

12. A system, comprising:
at least one reporting layer resource;
at least one processor in signal communication with the at least one reporting layer resource; and
a memory device including instructions that, when executed by the at least one processor, cause the system to:
  collect data regarding search events occurring within multiple locations;
  receive information relating to a search submitted by a user;
  determining whether each of one or more keywords in the search corresponds to one of a plurality of accessed keyword-counters based at least in part on the collected data, each accessed keyword-counter indicating a number of times the corresponding keyword was received in a search for which a result was not returned;
  for each detected keyword corresponding to one of the accessed keyword-counters, incrementing the corresponding keyword-counter;
  for each detected keyword not corresponding to a keyword-counter, establishing a keyword-counter and setting a value of the established keyword-counter to an initial value;
  store in the at least one reporting layer resource, in a first file for subsequent retrieval:
    a determined total number of search events occurring in a relevant period not producing search results;
    a determined N highest cumulated keywords in the relevant period; and
    a determined N highest cumulated documents produced by the search events;
  send a copy of the first file to a storage resource;
  save all sent copy files in the storage resource; and
  set a respective value of all keyword-counters in the first file in the storage resource to an initial value of zero after saving all sent copy files.

13. The system of claim 12, wherein collecting data regarding search events occurring within multiple locations comprises:
  retrieving at least one copy of a first file containing values of keyword-counters from at least one fleet resource;
  saving all retrieved copy files in at least one storage resource; and
  setting at least one value of at least one keyword-counter in the first file in the fleet resource to zero (0).

14. The system of claim 12, wherein periodically cumulating keyword-counter values based on the collected data comprises:
  setting the value of a timer to an initial value;
  retrieving all relevant saved files containing values of keyword-counters from a storage resource to the at least one reporting layer resource;
  deleting all the relevant saved files on the storage resource;
  cumulating the values of all the keyword-counters in the retrieved files;
  storing the cumulated values of the keyword-counters in the at least one reporting layer resource;
  determining N highest cumulated values;
  storing in the at least one reporting layer resource, for subsequent retrieval, the N highest cumulated values; and
  storing in the reporting layer resource, for subsequent retrieval, the cumulated values of all keyword-counters for which a search result was not returned, until the value of the timer corresponds to a time T.

15. The system of claim 12, wherein collecting data regarding search events comprises:
  receiving information relating to a search submitted by a user;
  determining whether each of one or more keywords in the search corresponds to one of a plurality of accessed keyword-counters, each accessed keyword-counter indicating a number of times the corresponding keyword was received in a search;
  for each detected keyword corresponding to one of the accessed keyword-counters, incrementing the corresponding keyword-counter;
  for each detected keyword not corresponding to a keyword-counter, establishing a keyword-counter and setting the value of the established keyword-counter to an initial value; and
  storing the respective values of all keyword-counters in the first file in the fleet resource.

16. A non-transitory computer-readable storage medium including instructions for analyzing keyword searches, the instructions when executed by a processor of a computing system causing the computing system to:
  collect data regarding search events occurring within multiple locations;
  receiving information relating to a search submitted by a user;
  determining whether each of one or more keywords in the search corresponds to one of a plurality of accessed keyword-counters based at least in part on the collected data, each accessed keyword-counter indicating a number of times the corresponding keyword was received in a search for which a search result was not returned;
  for each detected keyword corresponding to an accessed keyword-counter, incrementing the corresponding keyword-counter;
  for each detected keyword not corresponding to a keyword-counter, establishing a keyword-counter and setting a value of the established keyword-counter to an initial value; and
  store in a first file in the at least one reporting layer resource, for subsequent retrieval:
    a determined total number of search events occurring in a relevant period producing search results;
    a determined total number of search events occurring in the relevant period not producing search results;
    a determined N highest cumulated keywords in the relevant period; and
    a determined N highest cumulated documents produced by the search events;
  retrieve at least one copy of a first file containing values of keyword-counters from at least one fleet resource;
  save all retrieved copy files in at least one storage resource; and
  set at least one value of at least one keyword-counter in the first file in the at least one fleet resource to zero (0) after saving all retrieved copy files.

17. The non-transitory computer readable storage medium of claim 16, wherein periodically cumulating keyword-counter values based on the collected data comprises:
  setting the value of a timer to an initial value;

retrieving all relevant saved files containing values of keyword-counters from a storage resource to the at least one reporting layer resource;

deleting all the relevant saved files on the storage resource;

cumulating the values of all the keyword-counters in the retrieved files;

storing the cumulated values of the keyword-counters in the at least one reporting layer resource;

determining N highest cumulated values;

storing in the at least one reporting layer resource, for subsequent retrieval, the N highest cumulated values in the resource; and storing in the reporting layer resource, for subsequent retrieval, the cumulated values of all keyword-counters for which a search result was not returned, until the value of the timer corresponds to a time T.

18. The non-transitory computer readable storage medium of claim 16, wherein collecting data regarding search events comprises:

receiving information relating to a search submitted by a user;

determining whether each of one or more keywords in the search corresponds to one of a plurality of accessed keyword-counters, each accessed keyword-counter indicating a number of times the corresponding keyword was received in a search;

for each detected keyword corresponding to one of the accessed keyword-counters, incrementing the corresponding keyword-counter;

for each detected keyword not corresponding to a keyword-counter, establishing a keyword-counter and setting the value of the established keyword-counter to an initial value; and storing the values of all keyword-counters in a first file in a fleet resource.

* * * * *